Nov. 19, 1968   H. SEDLACEK   3,411,167
ROAD CONSTRUCTION
Filed April 11, 1966   5 Sheets-Sheet 1

Inventor:
Hugo Sedlacek
By: Spencer & Kaye
Attorneys

Nov. 19, 1968  H. SEDLACEK  3,411,167
ROAD CONSTRUCTION
Filed April 11, 1966  5 Sheets-Sheet 2

Inventor:
Hugo Sedlacek
By: Spencer & Kaye
Attorneys

Nov. 19, 1968  H. SEDLACEK  3,411,167
ROAD CONSTRUCTION
Filed April 11, 1966  5 Sheets-Sheet 3

Inventor:
Hugo Sedlacek
By Spencer & Kaye
Attorneys

United States Patent Office 3,411,167
Patented Nov. 19, 1968

3,411,167
ROAD CONSTRUCTION
Hugo Sedlacek, Rheinhausen, Germany, assignor to Fried.
Krupp Gesellschaft mit beschrankter Haftung, Essen,
Germany
Filed Apr. 11, 1966, Ser. No. 541,854
Claims priority, application Germany, Apr. 10, 1965,
P 15 34 205.9
5 Claims. (Cl. 14—1)

ABSTRACT OF THE DISCLOSURE

A roadway capable of being readily assembled and disassembled and arranged for mounting on vertical supports, the roadway including a plurality of identical vehicle supporting elements, each consisting of two longitudinal main girder members, a plurality of rectangular roadway plates having their narrow edges extending parallel to the main girder members and rigidly connected thereto, and angle irons defining curbs extending parallel to the narrow edges of the roadway plates and fastened to the main girder members, the vehicle supporting elements being connectible together by means of hinge portions which permit adjacent elements to be vertically pivoted relative to one another, and fastening means which permit adjacent elements to be connected together with any desired horizontal and vertical angular orientation with respect to each other.

---

The present invention relates to the field of road construction, and particularly to the construction of dismountable overhead highways.

It is known in the art to construct overhead highways, or overpasses, over existing roads, particularly in heavy traffic areas, in order to prevent two or more traffic flow paths from crossing at a single level.

Such an overhead highway, or overpass, may be constructed, depending upon local conditions, of different combinations of vertical supports, or trusses, and substantially horizontal vehicle supporting elements. The vehicle supporting elements may each consists of two main girder members, cross pieces, and a roadway plate positioned thereon. When this form of construction is used, two successive vehicle supporting elements are held in position with their ends facing each other on a common support or truss. Such a common support or truss may be consttiuted by ledge members disposed at those edges of the vehicle supporting elements which form the roadway joints, the ledge members being rigidly inserted into the vehicle supporting elements. The adjacent ledge members of two successive vehicle supporting elements each rests on a cross beam and on a single support or truss and is connected by means of hinges. In order to provide a curved roadway, the vehicle supporting elements may be provided with trapezoidal ledge members to enable a succession of vehicle supporting elements to have a polygonal configuration which approximates the desired curvature.

In this form of construction, the length of each straight-section of a curved roadway portion is determined by the distances between succeeding supports or trusses due to the fact that every discrete bend of the polygonally shaped, curved roadway portion must be positioned over one of the vertical supports or trusses. However, economic considerations require that these supports or trusses be disposed at substantially long intervals. Therefore, since it thus results that each vehicle supporting element must be relatively long, this form of construction has the disadvantage that it can only be used in the construction of roadways having relatively gradual bends, i.e., large radii of curvature. The only way that this could be avoided, in this form of construction, is by creating a sharp angle between each successive pair of vehile supporting elements. However, this would mean that vehicles would be forced to make sharp directional changes in passing from one vehicle supporting element to the next and the smooth flow of traffic would thereby be substantially impeded.

It is also possible to effect grade variations in roadways of the above-described type by providing vertical bends between successive vehicle supporting elements at points where they are mounted on a common support or truss. For example, one vehicle supporting element may be disposed horizontally and the next succeeding one may be disposed with a certain slope which deviates from the horizontal, the angular deviation between the two vehicle supporting elements being permitted by hinges which connect them to their common support or truss. Also, in this case, it would be necessary to provide an undesirably sharp angle between successive vehicle supporting elements unless the uneconomical expedient of arranging supports or trusses very close to one another were employed.

It is a primary object of the present invention to eliminate these drawbacks.

Another object of the present invention is to permit relatively high degrees of curvature to be formed in a dismountable roadway without creating sharp angles between succeeding vehicle supporting elements.

Yet another object of the present invention is to permit relatively large grade changes to be effected in such a roadway without requiring sharp grade variations between successive vehicle supporting elements.

Still another object of the present invention is to provide a dismountable vehicle roadway which is structurally simple and which is easy to install and disassemble.

These and other objects are achieved according to the present invention by the provision, in combination with a plurality of spaced vertical supports, of a dismountable elevated roadway mounted on these supports. This roadway primarily includes a plurality of identical vehicle supporting elements disposed in succession to form a vehile path. Each of these vehicle supporting elements includes two longitudinally extending main girder members having hinge portions disposed at the ends of their lower chords for forming, between adjacent pairs of vehicle supporting elements, a hinge connection whose pivot axis is transverse to the longitudinal dimension of the roadway. Each vehicle supporting element further includes a plurality of roadway plates supported between the main girder members thereof. The roadway according to the present invention further includes connecting means connecting together corresponding hinge portions of adjacent pairs of vehicle supporting elements. Finally, there are provided fastening means connecting together the upper chords of corresponding main girder members of adjacent pairs of vehicle supporting elements for forming bending-resistant joints between the vehicle supporting elements, these fastening means including spacer means for creating a predetermined longitudinal spacing between the upper chords of adjacent vehicle supporting elements. In roadways constructed according to the present invention, at least some of the resulting joints are located at points displaced from the vertical supports, and the pin means and fastening means form bending-resistant connections between adjacent pairs of the vehicle supporting elements for transmitting the bending moments created by loads due to traffic and to the weight of the vehicle supporting elements themselves for a distance equal to the length of several vehicle supporting elements.

Additional objects and advantages of the present invention will become apparent upon consideration of the following description when taken in conjunction with the accompanying drawings in which.

Figure 1:
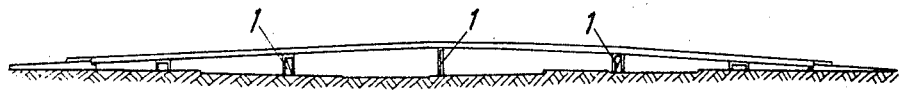
FIGURE 1 is an elevational view of one form of construction according to the present invention.
Figure 2:
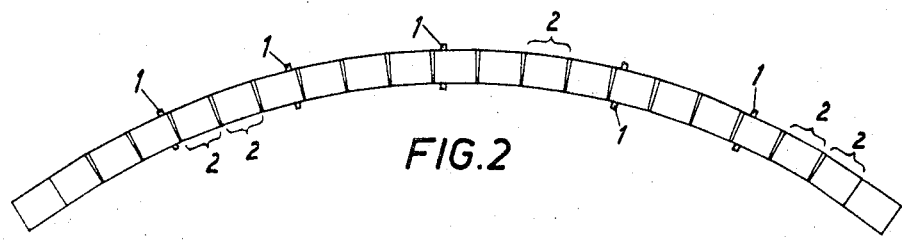
FIGURE 2 is a top plan view of the arrangement of FIGURE 1.
Figure 3:
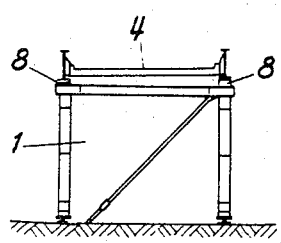
FIGURE 3 is a transverse, cross-sectional view of the arrangement of FIGURE 1.

Referring now to FIGURES 1 to 4, there is shown a roadway constructed according to the present invention to include a plurality of spaced supports 1, having the form of a portal, or bent, for example, as shown in FIGURE 3, and vehicle supporting elements 2 connected together in such a manner that no bending occurs between adjacent vehicle supporting elements. The supports, or trusses, 1 can have their vertical heights individually adjusted in a manner known per se.

Figure 4:
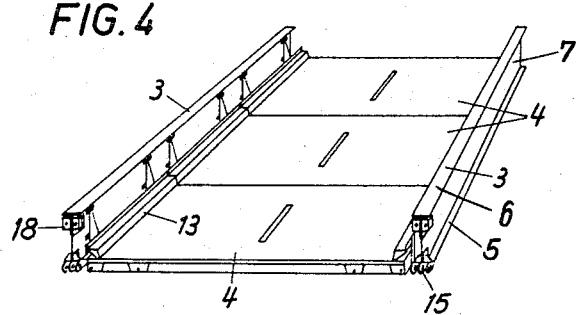
FIGURE 4 is a perspective view of one element of the arrangement of FIGURE 1.

As is shown in FIGURE 4, each vehicle supporting element 2 is composed primarily of two longitudinally extending main girder members 3 and three horizontal roadway plates 4. The roadway plates 4 are disposed substantially at the level of the lower chords of the main girder members 3 and are attached thereto in such a manner as to establish a connection which is resistant to bending. The main girder members 3 are each in the form of an I-beam having flanges 5 and 6 and a web 7. The portions 5, 6 and 7, and particularly the latter, are given dimensions which are sufficient to insure that, for any desired arrangement of the pedestals 8 of FIGURE 3 on which the vehicle supporting elements 2 rest, these girder members will be capable of supporting any loads produced by the vehicle traffic and the inherent weight of the vehicle supporting elements.

Figure 14:
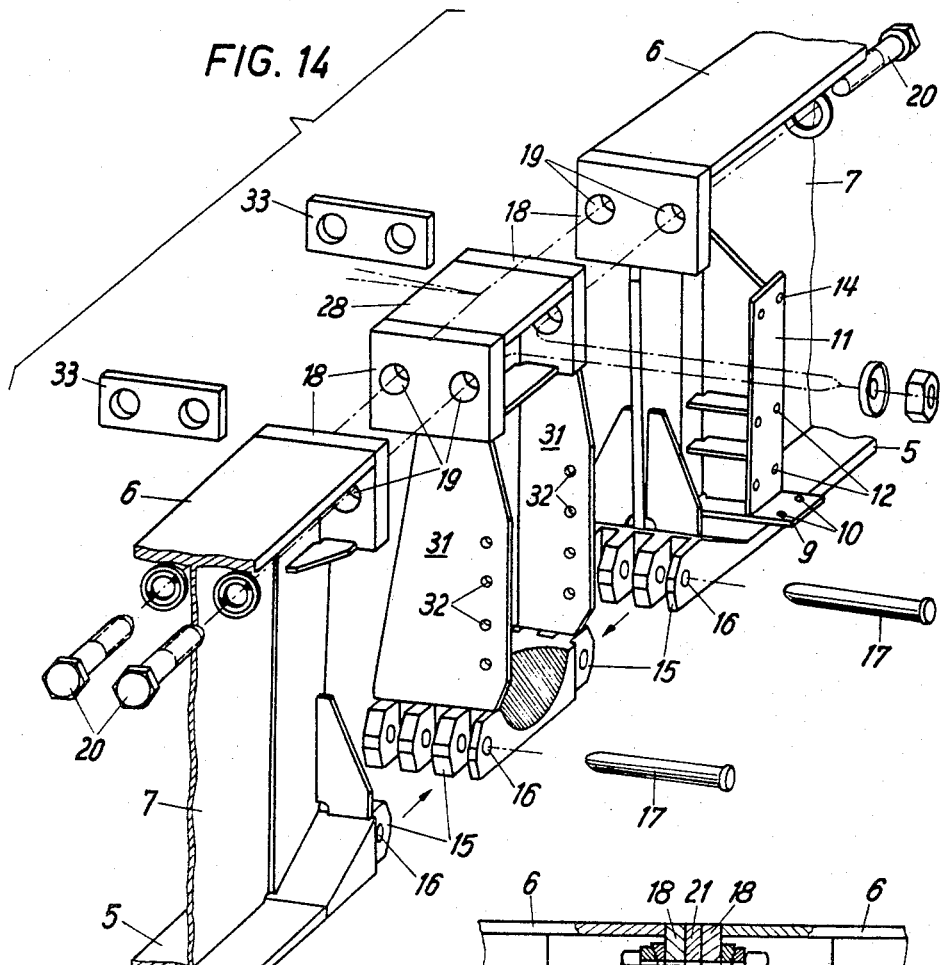
FIGURE 14 is an exploded, perspective view showing the connection of two adjacent vehicle supporting elements of the roadway of FIGURE 1.

Referring to FIGURES 4 and 14 together, the roadway plates 4 are supported along their narrow edges against the bottom flanges 5 constituting the lower chords of the main girder members 3. The plates are supported by substantially horizontal straps 9 projecting inwardly beyond their respective flange 5 and provided with bores 10 for receiving fastening bolts. Plates 4 are also connected to the main girder members 3 by means of substantially vertical web plates 11 arranged parallel to, and rigidly connected to the web portion 7 of their respective girder members 3. Each web plate 11 is provided with bores 12 for receiving fastening bolts. Preferably, two sets of straps 9 and 11 are provided for supporting one narrow edge of each roadway plate 4. Each plate 4 is provided with suitable brackets 4a having properly placed bolt passages for connection to the straps 9 and 11. This connection arrangement is highly advantageous in that it creates a bending-resistant coupling between the main girder members 3 and the roadway plates 4, while permitting the roadway plates to be easily detached from the main girder members.

The roadway plates 4 are preferably constructed in the form of hollow truss plates having a flat upper vehicle supporting plate supported by a plurality of truss members. These roadway plates are constructed to resist bending in such a manner that they can transmit the moments and forces created by traffic loads to the main girder members 3. Such an arrangement is shown, for example, in British Patent No. 966,880 to Hugo Sedlacek, complete specification published on Aug. 19, 1964.

At each junction between a roadway plate 4 and a girder member 3 is disposed an angle iron 13 constituting a protective curb. Each element 13 is equal in length to one narrow longitudinal edge of its associated roadway plate 4 and is bolted to the straps 11 associated with that roadway plate by means of bolts passing through bores 14 provided for that purpose on each strap 11.

Figure 22:
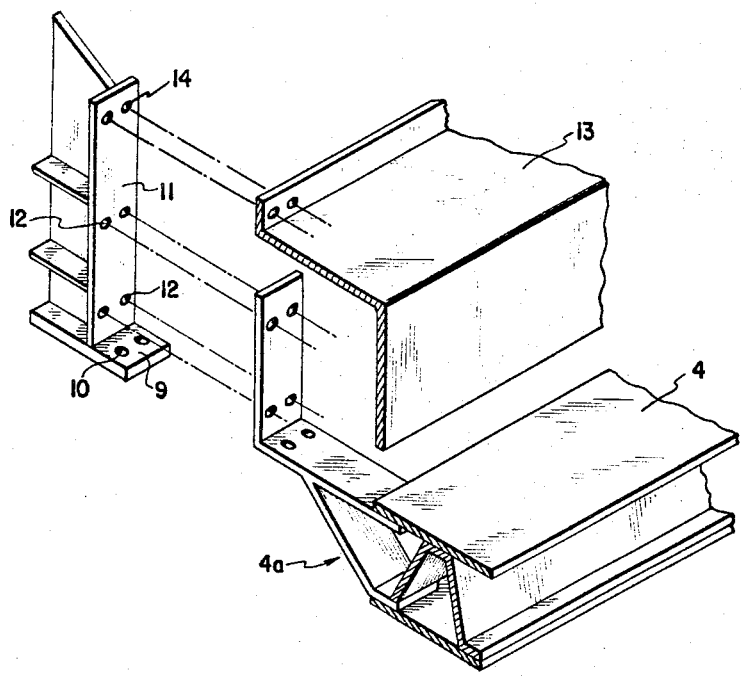
FIGURE 22 is an exploded, perspective detail view showing the connection of a protective curb and a roadway plate to vertical web plate of a main girder member.

FIGURE 22 shows in detail the relationship between a protective curb element 13 and one vertical strap 11 which is connected to a main girder member in the manner illustrated in FIGURE 14. The curb 13 is made of an angle iron having an upstanding rim, as indicated generally in FIGURE 4, provided with suitable bolt holes which are arranged to be in alignment with the holes 14 provided at the upper end of strap 11. As is also shown in FIGURE 22, a roadway plate 4, which is here shown to be of the type illustrated by afore-mentioned British Patent No. 966,880 is provided along its narrow edge with two brackets 4a, one of which is shown. The bracket 4a may be attached to the roadway plate in any suitable manner such as by welding, as mentioned in the British patent. The horizontal portion of the bracket 4a is provided with bolt holes arranged to align with the bolt holes 10 in the horizontal strap 9 associated with vertical web plate 11, while the vertical portion of bracket 4a is provided with bolt holes arranged in alignment with the holes 12 provided in the vertical web plate 11. For connecting the roadway plate to the main girder member, it is only necessary to place the bracket 4a on the strap 9 so that the vertical portion of the bracket abuts against the web plate 11 and to then bolt the bracket to the web plate 11 and strap 9. Then, the curb 13 can be placed in position and suitably bolted to the web plate 11. The vertical web of the angle iron constituting curb 13 may extend by sufficient amount to abut against the upper surface of roadway plate 4, or it may be dimensioned so as to be spaced a small distance above the vehicle supporting surface of the roadway plate.

All of the main girder members 3 of the various vehicle supporting elements are identical with one another, as are all of the roadway plates 4 and the irons 13, so that a very small variety of different components is required for constructing a complete roadway according to the present invention.

Each pair of adjacent vehicle supporting elements 2 is joined together by means of a hinge connection between the lower chords, or flanges, 5 of their associated main girder members 3. In addition, if a rigid connection is to be effected between adjacent vehicle supporting elements, they are also connected together by means of bolts 20 attached to pressure plates 18 mounted on the upper flanges, or chords, 6 of the girder members 3. In order to provide a desired slope variation between adjacent vehicle supporting elements 2 spacer, or filler, plates are interposed between the adjacent pressure plates, as will be described in greater detail below.

As is shown most clearly in FIGURES 14 to 17, each end of each lower flange 5 is formed with a plurality of longitudinally extending, spaced lugs 15 provided with bores 16 for the insertion of a pivot pin or bolt 17. Each set of lugs 15 thus defines one hinge portion. The lugs at one end of each flange 5 are laterally offset with respect to those at the other end thereof so that the lugs of one flange can be inserted between the lugs of the adjacent flange in the manner shown in FIGURE 15. Once the pin 17 is inserted, the lower flanges, or chords, of the adjacent main girder members will remain connected together. The materials and the dimensions of the pins 17 are so chosen that these pins will be capable of withstanding the stresses to which they are subjected when adjacent vehicle supporting elements 2 are subjected to maximum bending moments.

Each end of each upper flange, or chord, 6 of each main girder member has a pressure plate 18 welded thereto, with each pressure plate 18 extending perpendicular to its associated flange 6 and having its upper edge flush with the upper surface of flange 6. Each pressure plate 18 is provided with two bores 19, one on each side of the web 7 of the associated main girder member. These bores are positioned to be in alignment with corresponding bores 19 of the pressure plate 18 mounted on the adjacent end of the corresponding flange 6 of the next succeeding vehicle supporting element 2. When connecting together the upper flanges 6 of two succeeding vehicle supporting elements, a spacer plate is interposed between adjacent pressure plate 18. The thickness of this pressure plate determines the final spacing between the adjacent pressure plates 18 and hence the difference in slope between the roadway plates 4 of the adjacent vehicle supporting elements 2.

Figure 15:
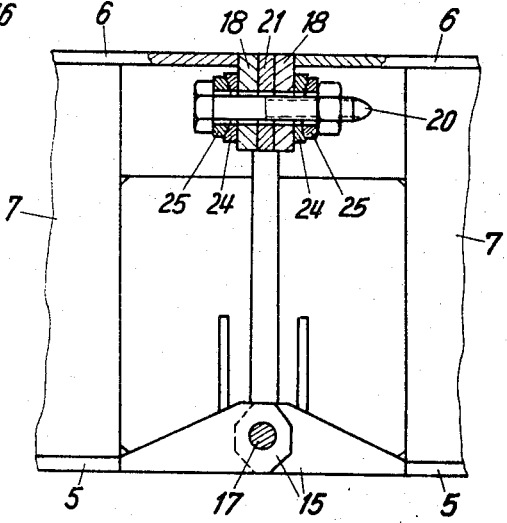
FIGURE 15 is a partially cross-sectional, elevational view showing one configuration of a connecting member according to the present invention.

For example, when it is desired to connect adjacent vehicle supporting elements together so that no slope, or grade, change occurs between their roadway plates, a suitably dimensioned spacer plate 21 having parallel faces is inserted between the pressure plates 18, as is shown in FIGURE 15. The thickness of plate 21 is such as to cause the roadway plates, and the main girder flanges, of the two adjacent vehicle supporting elements to be coplanar. Spacer plate 21 is given the same lateral dimensions as the pressure plates 18 and is provided with suitably aligned bores for the insertion of threaded connecting bolts 20.

Figure 16:
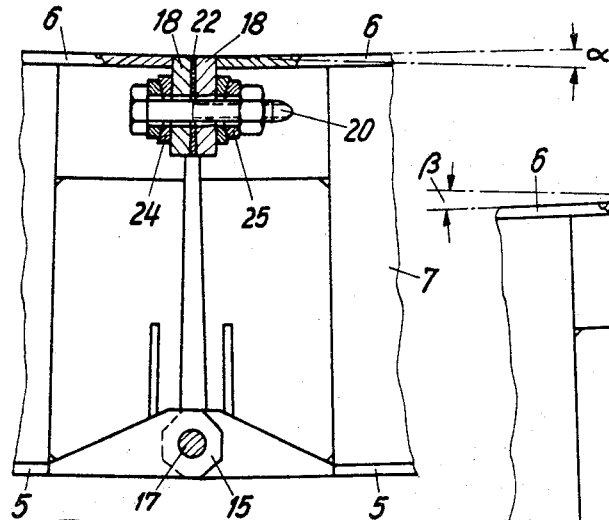
FIGURE 16 is a view similar to that of FIGURE 15 showing another configuration for the connecting member.
Figure 17:
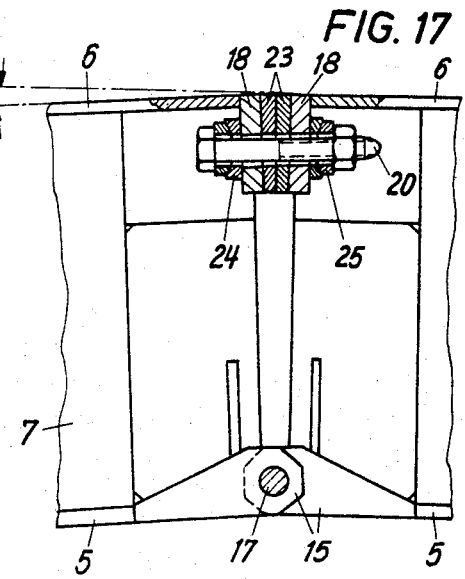
FIGURE 17 is a view similar to that of FIGURE 15 showing still another configuration for the connecting member.

Between the head and nut of bolt 20 and each respective pressure plate 18 there are disposed a first washer 24 having one flat surface bearing against the pressure plate 18 and one spherically concave surface, and a second washer 25 having one flat surface bearing against the bolt head or nut and a spherically convex surface which mates with the spherically concave surface of washer 24. The provision of a spherical bearing surface between the bolt 20 and each pressure plate 18 serves to assure that a proper transfer of load forces will be effectuated between the bolt and the pressure plates regardless of the vertical angle existing between the two adjacent vehicle supporting elements. FIGURES 16 and 17 show two arrangements in which this vertical angle differs from that of the arrangement of FIGURE 15.

In the arrangement of FIGURE 16, the plate 21 is replaced by a thinner, tapered spacer plate 22 which causes the right-hand vehicle supporting element to slope upwardly with respect to the left-hand supporting element. Such a spacer plate is employed when it is desired to give the roadway an upgrade, or to increase the inclination of a roadway which already has some upgrade. The roadway plates of the right-hand vehicle supporting element will then have an inclination angle α with respect to the roadway plates of the left-hand vehicle supporting element. In order to assure a good transfer of forces between vehicles supporting elements, the spacer plate 22 is preferably tapered by the same angle α.

FIGURE 17 shows the case where it is desired to provide a decrease in slope between two adjacent vehicle supporting elements. In this case, the planar spacer plate 21 of FIGURE 15 is replaced by a thicker spacer 23, which may be constituted by two indentical spacer plates. If it is desired to decrease the angular change between the two vehicle supporting elements, one of the plates constituting spacer 23 can be removed in order to cause the angle β between the two adjacent vehicle supporting elements to be halved. In this case also, the spacer 23 should have the same taper angle as that existing between the two adjacent vehicle supporting elements.

Figure 5:
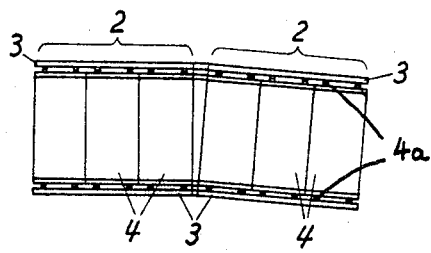
FIGURE 5 is a top plan view of two adjacent elements of the arrangement of FIGURE 1.
Figure 6:
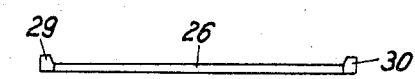
FIGURE 6 is an elevational, detail view of another element of the arrangement of FIGURE 1.
Figure 7:
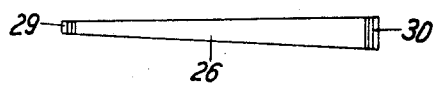
FIGURE 7 is a plan view of the element of FIGURE 6.

Having described the manner in which the slope of a roadway may be varied according to the present invention, the manner in which the horizontal curvature of such a roadway can be varied will now be described in detail in connection with FIGURES 5 to 14. FIGURE 5 shows a generally diagrammatic top view of two adjacent vehicle supporting elements 2 connected together through the intermediary of a wedge-shaped element 26 so that the longitudinal axes of the two vehicles supporting elements are angularly offset with respect to one another in a horizontal plane, the angular deviation between the longitudinal axes being equal to the taper angle of element 26. One embodiment of such a wedge-shaped element is shown in elevation in FIGURE 6 and in a plan view in FIGURE 7. The smaller narrow edge of element 26 is provided with an upwardly extending bracket 29, while the larger narrow edge thereof is provided with a similar bracket 30.

Figure 8:
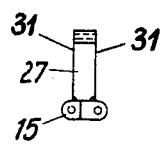
FIGURE 8 is an elevational view of an inside connecting member for a curved portion of the roadway of FIGURE 1.
Figure 9:
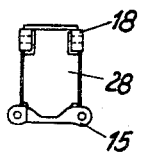
FIGURE 9 is an elevational view of an outside connecting member for a curved portion of the roadway of FIGURE 1.

When such a wedge-shaped element is interposed between two adjacent vehicle supporting elements 2, the adjacent main girder members 3 at the inside of the resulting curve are connected together by means of a connecting element 27, shown in FIGURE 8, and the two adjacent main girder members 3 at the outside of this curve are connected together by another connecting element 28, shown in FIGURE 9 and in greater detail in FIGURE 14. The connecting elements 27 and 28 permit the two adjacent vehicle supporting elements 2 to be connected together in a manner similar to that described above in connection with FIGURES 14 to 17 so that a bending-resistant joint is attained.

One embodiment of the connecting element 28 is shown in detail in FIGURE 14 to include a lower chord having a set of hinge lugs 15 formed at either end thereof, two upwardly extending straps 31 spaced apart from one another in the longitudinal direction of the roadway, and two pressure plates 18 spaced apart by an upper flange, or chord, of the connecting element 28. The space between straps 31 is provided for the insertion of bracket 30 of wedge-shaped element 26 and bores 32 are provided in the straps 31 for the insertion of bolts (not shown) for holding bracket 30 in place.

Connecting element 27 is similarly constructed with a smaller spacing between its straps 31 for the insertion of bracket 29 of element 26. Brackets 29 and 30 are of course provided with suitable bores (not shown) which are arranged to be in alignment with bores 32 when the upper surface of element 26 is flush with upper surface of roadway plates 4.

The upper chord of connecting element 28 is formed so that the pressure plates 18 connected thereto are oblique at a horizontal angle with respect to one another which is equal to the horizontal angular deviation between the two adjacent vehicle supporting elements to be connected together. Similarly, the lower chord of this connecting element is formed so that the common center line of the bores 16 disposed at one end thereof forms the same angle with the common center line of the bores 16 disposed at the other end thereof. These chords are so formed that the planes of pressure plates 18 and the common center lines of the bores 16 converge at a point corresponding to the center of curvature of the curved roadway section. The lugs 15 of connecting element 27 are constructed in a similar manner.

Each vehicle supporting element 2 is connected to one side of the connecting elements 27 and 28 in a manner similar to that described above in connection with FIGURES 15 to 17. For example, as is shown most clearly in FIGURE 14, the lugs 15 at one end of the lower chord of element 28 are inserted between the lugs 15 at one end of flange 5 of a vehicle supporting element and are held together by the insertion of a pin 17. The adjacent pressure plates 18 of element 28 and upper flange 6 may then have a spacer plate 33 interposed therebetween before these pressure plates are bolted together by a threaded bolt 20. Connecting element 27 is not provided with two pressure plates, but has a single plate constituting its upper chord and provided with a bore extending completely therethrough for the insertion of a single pair of bolts 20 which extend from the pressure plate 18 of one vehicle supporting element to the pressure plate 18 of the next succeeding vehicle supporting element. The short length of element 27 makes it unnecessary to provide two pressure plates and two pairs of bolts.

It may be noted that the form of construction of elements 27 and 28 is such that two or more sets of such elements may be inserted together with a corresponding number of wedge elements 26, between two adjacent vehicle supporting elements 2 if it is desired to give the roadway a smaller radius of curvature. Various roadway configurations which can be constructed using connecting elements according to the present invention are shown in plan view in FIGURES 10 to 13.

Figure 10:
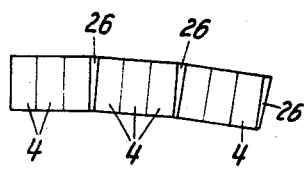
FIGURE 10 is a plan view showing one form of curvature of a portion of a roadway according to the present invention.

As is shown in FIGURE 10, one wedge element 26 is inserted between each adjacent pair of vehicle supporting elements, each vehicle supporting element including three roadway plates 4. Such an arrangement may, for example, give the resulting roadway portion a radius of curvature of the order of 150 meters if each vehicle supporting element has a length of the order of 9 m. with an angle of 4° between adjacent vehicle supporting elements.

Figure 11:
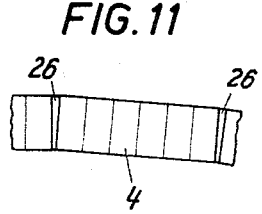
FIGURE 11 is a view similar to that of FIGURE 10 showing another form of curvature.

Utilizing vehicle supporting elements having the same dimensions as those shown in FIGURE 10, the arrangement of FIGURE 11 employs one wedge-shaped element 26 between every other pair of vehicle supporting elements, there thus being six roadway plates 4 between succeeding elements 26. This arrangement can give the resulting roadway portion a radius of curvature of 300 meters, for example.

Figure 12:
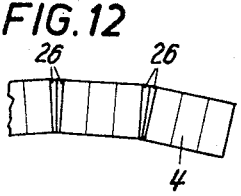
FIGURE 12 is a view similar to that of FIGURE 10 showing yet another form of curvature.

Similarly, a radius of curvature as small as 75 meters can be obtained in the embodiment of FIGURE 12 wherein two wedge-shaped elements 26 are connected together and inserted between each adjacent pair of vehicle supporting elements.

Figure 13:
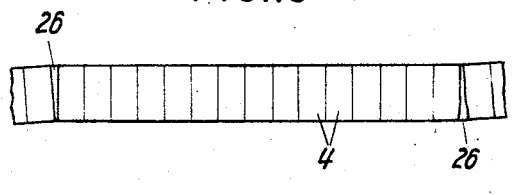
FIGURE 13 is a view similar to that of FIGURE 10 showing still another form of curvature.

Finally, FIGURE 13 shows an arrangement wherein the disposition and orientation of a plurality of wedge-shaped elements 26 gives the resulting roadway portion a S-shaped curvature.

Referring now to FIGURE 18 to 21, there are shown various grade variations which can be achieved in roadways constructed according to the present invention.

Figure 18:
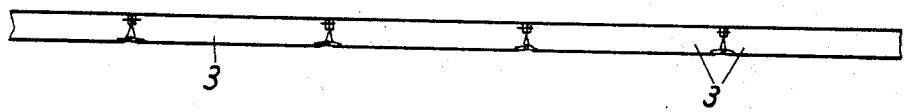
FIGURE 18 is an elevational, diagrammatic view showing one configuration of a plurality of vehicle supporting elements according to the present invention.

In the arrangement shown in FIGURE 18, the vehicle supporting elements 2 are connected together in a straight line so that no grade variation exists along the roadway portion constituted by this group of vehicle supporting elements.

Figure 19:
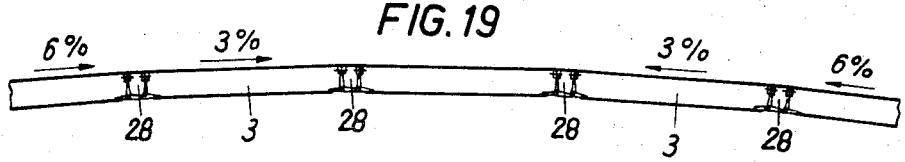
FIGURE 19 is a view similar to that of FIGURE 18 showing another configuration thereof.

FIGURE 19 shows an arrangement wherein the vehicle supporting elements are connected together to form an upwardly convex roadway portion. In the arrangement of this figure, the central vehicle supporting element is horizontal, the two vehicle supporting elements connected thereto have a grade of 3% with respect to the central element, and the two outer vehicle supporting elements have a grade of 6% with respect to the central, horizontal vehicle supporting elements. This roadway portion is also shown to have a horizontal curvature, the main girder members 3 to the outside of this curve being visible. For this purpose, the adjacent main girder members 3 at the outside of the horizontal curve are connected together by means of connecting elements 28 and the main girder members at the inside of the curve are connected together by connecting elements 27 (not visible). In order to attain the desired grade variation, the spacers 33 shown in FIGURE 14 are replaced with tapered spacer plates each similar to one of the plates of spacer 23 of FIGURE 17.

Figure 20:
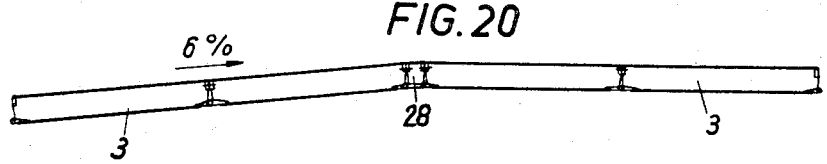
FIGURE 20 is a view similar to that of FIGURE 18 showing yet another configuration thereof.

In the arrangement of FIGURE 20, the two central vehicle supporting elements are connected together by means of connecting elements 27 and 28 in a manner similar to that described in connection with FIGURE 19, with each spacer 33 of FIGURE 14 being replaced by a spacer similar to spacer 23 of FIGURE 17. The remaining connections between adjacent vehicle supporting elements have the form shown in FIGURE 15 and these vehicle supporting elements extend in a straight line with respect to one another.

Figure 21:
FIGURE 21 is a view similar to that of FIGURE 18 showing still another configuration thereof.

FIGURE 21 shows an arrangement wherein the two central vehicle supporting elements are only connected together by means of a hinge joint at their lower chords. Thus, no bending-resistant connection is effected between the upper chords of these elements. Such an arrangement can find application in the construction of a highway or bridge having a cantilever arrangement. The remaining connections between adjacent vehicle supporting elements are effected in the manner shown in FIGURE 15.

One of the advantages of roadways constructed according to the present invention is that identical parts are used in the construction of every vehicle supporting element. Thus, the various component parts are readily interchangeable between vehicle supporting elements.

Another advantage of the present invention is that the vertical supports or trusses may be disposed relatively far apart since any two vehicle supporting elements may be connected together to have any degree of vertical and/or horizontal curvature at any point, regardless of whether or not a support or truss is present at that point. It is also possible, in the forms of construction according to the present invention, to add or remove supports or trusses if, during use, changes occur in the loading conditions.

The connection together of two vehicle supporting elements with or without the intreposition of separate connecting elements and wedge-shaped elements, at a point not supported by a vertical support or truss in such a manner that the resulting joint is resistance to bending and is capable of transmitting the roadway loads to the supports or trusses is made possible by providing a hinge connection between the lower chords of the adjacent vehicle supporting elements and a pressure plate joint between the upper chords thereof, this latter joint being made rigid by a bolt connected between the pressure plates.

Regardless of the vertical angle existing between two adjacent vehicle supporting elements, a uniform transmission of forces between the upper chords thereof is effected by providing spherical bearing surfaces between the bolt and each pressure plate.

When it is desired to give the roadway a horizontal curvature, the present invention provides for the interposition of at least one wedge-shaped element between two vehicle supporting elements and for the mounting of this wedge-shaped element by securing each end, with the aid of pins or bolts, between two straps of a suitable connecting element.

It may thus be seen that, since the present invention provides for the rigid connection of adjacent vehicle supporting elements at points not supported by vertical supports or trusses, a roadway can be constructed having widely spaced vertical supports or trusses and having very small radii curvature. Moreover, since the individual vehicle supporting elements are relatively short in comparison with their width, the polygonally curved roadway portions will have a shape which closely approximates the desired smooth curve. For similar reasons, roadways constructed according to the present invention can be made to have slope, or grade variations which closely approximate ideal gradual grade variations.

It will be understood that the above description of the present invention is susceptible to various modifications, changes and adaptations, and the same are intended to be comprehended within the meaning and range of equivalents of the appended claims.

What is claimed is:

1. In combination with a plurality of spaced vertical supports, a dismountable elevated roadway mounted on said supports and comprising:
    (a) a plurality of identical vehicle supporting elements disposed in succession to form a vehicle path, each of said vehicle supporting elements including:
        (i) two longitudinally extending main girder members each having an upper chord, a lower chord and a web portion rigidly connected between said chords, each said lower chord having a plurality of substantially horizontal straps rigidly connected thereto and projecting laterally therefrom, and each said web portion having a plurality of substantially vertical web plates, one for each said strap, rigidly connected to said web portion, each said web plate being disposed above its associated horizontal strap, said girder members further having hinge portions disposed at the ends of their lower chords for forming, between adjacent pairs of said vehicle supporting elements, a hinge connection whose pivot axis is transverse to the longitudinal dimension of said roadway;
        (ii) a plurality of roadway plates supported between said main girder members, each said plate being substantially rectangular and having each of its narrow sides extending adjacent, and parallel to, said lower chord of a respective one of said main girder members, each said plate carrying at least four brackets, two of which project laterally from each narrow side thereof, each said bracket resting on a respective horizontal strap and abutting against that web plate associated with said respective strap, and being bolted to its associated strap and web plate; and
        (iii) a plurality of angle irons, two for each said roadway plate, each extending along, and above, a respective narrow side of its associated roadway, plate said angle irons being fastened to said vertical web plates of said main girder members;
    (b) connecting pin means connecting together corresponding hinge portions of adjacent pairs of said vehicle supporting element;
    (c) fastening means connecting together the upper chords of corresponding main girder members of adjacent pairs of said vehicle supporting elements for forming bending-resistant joints between said vehicle supporting elements, said fastening means including spacer means for creating a predetermined longitudinal spacing between said upper chords; and
    (d) at least some of said joints being located at points displaced from said vertical supports and said pin means and fastening means form bending-resistant connections between adjacent pairs of said vehicle supporting elements for transmitting the bending moments created by loads due to traffic and to the weight of said vehicle supporting elements for a distance equal to the length of several of said vehicle supporting elements.

2. An arrangement as defined in claim 1 further comprising: at least one wedge-shaped element connected between two adjacent vehicle supporting elements for imparting a horizontal directional change to said roadway; first connecting means supporting the large narrow edge of said wedge-shaped element and connecting together one of said girders of one of said two adjacent supporting elements with its corresponding girder of the other of said adjacent supporting elements; and second connecting means supporting the small narrow edge of said wedge-shaped element and connecting the other one of said girders of said one supporting element with its corresponding girder of said other supporting element.

3. An arrangement as defined in claim 2 wherein said fastening means comprises: a plurality of pressure plates one at each end of the upper chord of each said main girder member and the upper end of each side of each said first connecting means; a plurality of screw bolts each passing through a respective adjacent pair of said pressure plates; and a plurality of threaded nuts each disposed on one of said bolts for rigidly holding said pressure plates; and wherein said spacer means comprises a plurality of spacer plates each interposed between a respective adjacent pair of said pressure plates.

4. An arrangement as defined in claim 3 wherein said fastening means further comprises a plurality of pressure transmitting means defining a spherically arcuate bearing surface, each of said pressure transmitting means being positioned in a bearing manner between a respective one of said pressure plates at that one of said nuts or bolt heads with which it cooperates.

5. An arrangement as defined in claim 2 wherein each of said connecting means comprises: two spaced strap members surrounding its associated narrow edge of a respective one of said wedge-shaped elements, said straps and said narrow edges being formed with passages for connecting bolts; and a plurality of connecting bolts connecting each said narrow edge to the straps of its associated connecting means.

References Cited

UNITED STATES PATENTS

| | | | |
|---|---|---|---|
| 527,430 | 10/1894 | Knights | 14—73 XR |
| 1,964,208 | 6/1934 | Leland | 52—632 |
| 2,199,700 | 5/1940 | Gramelspacher | 94—15 |
| 3,036,539 | 5/1962 | Storey | 14—27 XR |
| 3,066,332 | 12/1962 | Sedlacek | 14—27 XR |

JACOB L. NACKENOFF, *Primary Examiner.*